(12) United States Patent
Conlon

(10) Patent No.: US 11,359,521 B2
(45) Date of Patent: *Jun. 14, 2022

(54) DISPATCHABLE STORAGE COMBINED CYCLE POWER PLANTS

(71) Applicant: William M. Conlon, Palo Alto, CA (US)

(72) Inventor: William M. Conlon, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/232,486

(22) Filed: Apr. 16, 2021

(65) Prior Publication Data

US 2021/0324765 A1    Oct. 21, 2021

Related U.S. Application Data

(63) Continuation of application No. 15/966,207, filed on Apr. 30, 2018, now Pat. No. 10,982,570, which is a
(Continued)

(51) Int. Cl.
*F01K 23/10* (2006.01)
*F01K 3/02* (2006.01)
(Continued)

(52) U.S. Cl.
CPC ............ *F01K 23/10* (2013.01); *F01K 3/02* (2013.01); *F01K 3/18* (2013.01); *F01K 3/185* (2013.01);
(Continued)

(58) Field of Classification Search
CPC ........ F02C 1/04; F02C 1/05; F02C 1/06; F02C 6/14; F01K 23/10; F01K 3/02; F01K 3/18;
(Continued)

(56) References Cited

U.S. PATENT DOCUMENTS 3,796,045 A * 3/1974 Foster-Pegg ............ F02C 7/143
60/39.83
4,265,223 A    5/1981 Miserlis et al.
(Continued)

FOREIGN PATENT DOCUMENTS

EP        2722496 A2    4/2014
WO    2015/149124 A1    10/2015

OTHER PUBLICATIONS

Supplementary European Search Report, EP15803786, dated Mar. 21, 2018, 1 page.
(Continued)

*Primary Examiner* — Alain Chau
(74) *Attorney, Agent, or Firm* — Schmidt Patent Law, Inc.

(57) ABSTRACT

A dispatchable storage combined cycle power plant comprises a topping cycle that combusts fuel to generate electricity and produce hot exhaust gases, a steam power system, a heat source other than the topping cycle, and a thermal energy storage system. Heat from the heat source, from the thermal energy storage system, or from the heat source and the thermal energy storage system is used to generate steam in the steam power system. Heat from the topping cycle may be used in series with or in parallel with the thermal energy storage system and/or the heat source to generate the steam, and additionally to super heat the steam.

20 Claims, 6 Drawing Sheets

Related U.S. Application Data continuation of application No. PCT/US2016/060608, filed on Nov. 4, 2016.

(60) Provisional application No. 62/251,338, filed on Nov. 5, 2015.

(51) Int. Cl.
| | | |
|---|---|---|
| *F01K 3/18* | (2006.01) | |
| *F01K 11/02* | (2006.01) | |
| *F01K 13/02* | (2006.01) | |
| *F03G 6/00* | (2006.01) | |
| *F22B 1/06* | (2006.01) | |
| *F22B 1/00* | (2006.01) | |

(52) U.S. Cl.
CPC ............. *F01K 3/186* (2013.01); *F01K 11/02* (2013.01); *F01K 13/02* (2013.01); *F03G 6/005* (2013.01); *F22B 1/006* (2013.01); *F22B 1/06* (2013.01); *Y02E 10/46* (2013.01); *Y02E 20/16* (2013.01); *Y02E 60/14* (2013.01)

(58) Field of Classification Search
CPC ......... F01K 3/185; F01K 3/186; Y02E 60/14; Y02E 10/46
See application file for complete search history.

(56) References Cited

U.S. PATENT DOCUMENTS

| | | | | |
|---|---|---|---|---|
| 5,384,489 | A | * | 1/1995 | Bellac ................ F03D 9/18 60/659 |
| 5,444,972 | A | | 8/1995 | Moore |
| 5,887,418 | A | | 3/1999 | Bruckner et al. |
| 6,941,759 | B2 | | 9/2005 | Bellac et al. |
| 7,640,746 | B2 | * | 1/2010 | Skowronski ........ F03G 6/005 60/641.8 |
| 7,954,321 | B2 | | 6/2011 | Shinnar |
| 7,971,437 | B2 | | 7/2011 | Flynn et al. |
| 8,039,984 | B2 | | 10/2011 | Ridnik et al. |
| 8,171,733 | B2 | | 5/2012 | Smith |
| 8,286,429 | B2 | | 10/2012 | Heide et al. |
| 8,621,868 | B2 | | 1/2014 | Shinnar |
| 8,627,665 | B2 | * | 1/2014 | Ruer ................... F01K 3/12 60/659 |
| 8,701,411 | B2 | | 4/2014 | Koketsu |
| 9,816,490 | B2 | * | 11/2017 | Conlon ................ F01K 7/16 |
| 10,060,296 | B2 | | 8/2018 | Friesth |
| 2001/0004830 | A1 | * | 6/2001 | Wakana ............ F25J 1/0228 60/39.182 |
| 2004/0045299 | A1 | * | 3/2004 | Blatter .............. F01D 19/00 60/39.182 |
| 2006/0174622 | A1 | | 8/2006 | Skowronski |
| 2006/0266039 | A1 | | 11/2006 | Skowronski et al. |
| 2007/0012041 | A1 | | 1/2007 | Goldman |
| 2007/0157614 | A1 | | 7/2007 | Goldman |
| 2008/0127647 | A1 | | 6/2008 | Leitner |
| 2009/0229264 | A1 | | 9/2009 | Gilon |
| 2009/0320828 | A1 | | 12/2009 | Koketsu et al. |
| 2010/0101231 | A1 | | 4/2010 | Westmeier |
| 2010/0175365 | A1 | | 7/2010 | Ota |
| 2010/0229523 | A1 | | 9/2010 | Holt et al. |
| 2010/0301614 | A1 | * | 12/2010 | Ruer .................. F02C 1/04 290/1 A |
| 2011/0000213 | A1 | * | 1/2011 | Skowronski ........ F01K 3/18 60/650 |
| 2011/0100004 | A1 | * | 5/2011 | Al-Mazeedi ........ H02S 10/10 60/641.8 |
| 2011/0100005 | A1 | * | 5/2011 | Sampson ............ G05B 13/021 60/641.8 |
| 2011/0126824 | A1 | | 6/2011 | Conlon et al. |
| 2011/0127773 | A1 | | 6/2011 | Freund et al. |
| 2011/0137480 | A1 | | 6/2011 | Sampson et al. |
| 2011/0232295 | A1 | * | 9/2011 | Carroni ................ F01K 23/101 60/773 |
| 2012/0000202 | A1 | | 1/2012 | Salcedo et al. |
| 2012/0102950 | A1 | | 5/2012 | Turchi |
| 2012/0131898 | A1 | * | 5/2012 | Mokheimer ........ F03G 6/04 60/641.14 |
| 2012/0167873 | A1 | | 7/2012 | Venetos et al. |
| 2012/0255309 | A1 | | 10/2012 | Venetos et al. |
| 2013/0152586 | A1 | | 6/2013 | Mishima et al. |
| 2014/0033676 | A1 | | 2/2014 | Pang et al. |
| 2014/0060046 | A1 | | 3/2014 | Takahashi et al. |
| 2014/0102073 | A1 | | 4/2014 | Pang et al. |
| 2014/0202157 | A1 | | 7/2014 | Shinnar et al. |
| 2014/0223906 | A1 | | 8/2014 | Gee et al. |
| 2015/0143806 | A1 | | 5/2015 | Friesth |
| 2015/0354545 | A1 | * | 12/2015 | Conlon .............. F01K 3/18 60/39.182 |

OTHER PUBLICATIONS

Turchi et al., "Gas Turbine/Solar Parabolic Trough Hybrid Designs", Conference Paper NREL/CP-5500-50586, Mar. 2011, 11 pages.
Document of The World Bank, Report No. ICR2693; "Implementation Completion and Results Report (TF-58314) on a Grant in the Amount of US$ 43.2 Million from the Global Environment Facility Trust Fund to the Office National De L'Electricite et de L'Eau Potable (Onee) of the Kingdom of Morocco for an Integrated Solar Combined Cycle Power Project", Jun. 25, 2013, 67 pages.
International Search Report corresponding to PCT/US15/32643, dated Oct. 6, 2015, 4 pages.
Alqahtani, "Integrated Solar Combined Cycle Power Plants: Paving the Way for Thermal Solar", Thesis, Department of Environment Duke University, 2015, 71 pages.
International Search Report corresponding to PCT/US16/60608, dated Jan. 31, 2017, 1 page.
Supplementary European Search Report, EP16863071, dated Jun. 11, 2019, 1 page.

* cited by examiner

DISPATCHABLE STORAGE COMBINED CYCLE POWER PLANTS

CROSS REFERENCE TO RELATED APPLICATIONS

This application is a continuation of U.S. patent application Ser. No. 15/966,207 filed Apr. 30, 2018, which is a continuation of International Patent Application No. PCT/US2016/060608 filed Nov. 4, 2016. PCT/US2016/060608 claims benefit of priority to U.S. Provisional Patent Application No. 62/251,338 filed Nov. 5, 2015. Each of these applications is incorporated herein by reference in its entirety.

FIELD OF THE INVENTION

The invention relates generally to the operation of combined cycle power plants with heat storage, including for example solar hybrid combined cycle power plants having heat storage.

BACKGROUND

Electricity is a 'just-in-time' commodity, necessitating that supply and demand of power be balanced in order to maintain specified frequency and voltage. The electric demand or load varies based on the needs of connected industrial, commercial, or residential customers for lighting, HVAC, electronics and appliances, pumps and motors, etc. Electricity demand displays patterns that are influenced by the level of macro-economic activity, weather, customary working hours, time-of-day, as well as many other factors.

Electric generation must supply the demand, generally in the most economic manner, given constraints on fuel cost/availability, power plant operating/maintenance condition, availability of cooling for heat engines, and transmission costs or capacity constraints. Generating units are generally dispatched in merit order, based on the marginal cost of generation, with the most economical operated the most and supplying the 'base load.' In addition to the marginal cost of operation, which is proportional to the cost of fuel and other variable costs such as an overhaul accrual, generating units also have startup cost for fuel and wear-and-tear to bring them from a cold condition to an operating condition. Accordingly, some generating units may be placed in a 'hot standby' condition, if the standby operating costs are less than the startup costs, and the unit is required to meet anticipated demand or reserve margins.

The marginal operating cost will determine when a generating unit is dispatched and how many megawatt-hours it will produce. In a regulated integrated utility responsible for generation, transmission and distribution, the fixed costs for capital amortization are covered as return on invested capital mandated by utility commissions or other rate setting entities. With the introduction of electric markets, independent power producers (IPPs) must cover fixed costs and profit from the difference between the price of electricity and the marginal cost to generate power. This creates a tension between the efficiency of a new generating unit and the cost to build it, as novel efficiency measures must pay for themselves as well as a risk premium. The book value of a power plant is first cost less accumulated amortization offset by improvements, but its market value may be for example determined as the net present value of discounted cash flows, which depends on the investors' return requirements and forecasts of the cash flows. The cash flow forecasts are influenced by the economic dispatch order, which may change based on fuel costs or if newer and more efficient units are constructed.

Because sunlight is free, solar power plants have very low marginal costs and are always at the front of the dispatch queue, and in some jurisdictions are mandated to be dispatched first. However solar thermal power plants are relatively expensive to construct ($3 to $6 per watt, for example), and their low capacity factor (typically less than 25% of nameplate), requires a high price for electricity to cover the fixed costs and profit. As a matter of public policy, various countries and utility markets provide incentives to encourage construction of solar power plants, using mechanisms such as:

renewable energy pricing policy such as feed-in tariffs (FITs), standard offers, or power purchase agreements (PPAs) offering a guaranteed payment per kilowatt-hour;

tax policy such as investment or production tax credits and accelerated depreciation;

environmental policy such as carbon credits or taxes and renewable portfolio standards.

The most important of these has been pricing policy, because it is revenue that is most important in determining whether an investment in a new power plant will be profitable, and revenue certainty reduces the financial risk premium. Energy pricing policy has favored solar thermal power plant designs that resemble base load plants with high efficiency, and has dis-favored load following capability. Feed in tariffs may also favor smaller power plants with higher capacity factors obtained by thermal energy storage. As renewable power has become competitive, these incentives are being reduced or eliminated, and renewable power plants will be expected to consider regulatory, market, commodity, and technology risks, similar to conventional power plants Rankine Steam Cycles are commonly used to convert thermal to electric energy. Raising the steam temperature tends to increase the power conversion efficiency, permitting a smaller amount of heat (e.g., fossil or solar) to produce the same power. Regenerative feedwater heating also increases efficiency, but at the expense of reduced power output for the same steam flow. Raising the pressure tends to increase the specific work (per unit of steam flow), permitting more power for the same size power block. Above pressures of about 50 to 75 bar, depending on the superheated steam temperature, the expanding steam may begin to condense within the turbine, potentially damaging the turbine by erosion. Accordingly at higher pressures, some form of reheat is required to avoid harmful condensation in the low pressure stage of the turbine. These and other factors determine the most economical steam conditions and steam cycle for use in a thermal power plant.

Because solar fields are expensive, by conventional thinking it is desirable to increase the thermal to electric efficiency of the power block by increasing the temperature and adding regenerative feedwater heating. These steps result in the use of expensive, and sometimes exotic, materials, manufacturing, and construction measures. These steps tend to reduce the nameplate power output of the turbine-generator (per unit of steam flow), increase startup time, and reduce load following capability.

As more intermittent renewable generation is installed, load following becomes more important than base load power. Consequently there is an increasing need for generating units with resiliency and flexibility to follow load.

The "Duck Curve" illustrates the challenge of managing a green grid. As can be seen in FIG. 1, the California Independent System Operator (CAISO) Base Load is being reduced as solar power ramps up its generation during the daytime. As the installed base of solar generation increases over the years, the afternoon 'hump' disappears and becomes an increasingly large depression causing two gigawatt-scale problems:

overgeneration risk occurs because thermal generation resources must continue to operate to be available when the preferred renewable resources become unavailable, as the sun sets for example;

ramp need occurs as the evening load increase coincides with the decreasing output from solar power.

Ironically, the conventional modern solar thermal power plant is not well suited to this regime. Without thermal storage, such plants contribute to the 'Duck Curve' depression. By adding thermal energy storage, conventional solar thermal plants can address over-generation by operating during the evening peak rather than during the afternoon depression. But their base load approach to power block design means these plants are not well suited to load following and cannot materially address the steep ramps.

SUMMARY

This specification discloses combined cycle power plants comprising a thermal energy storage system that stores heat. The stored heat may be used in a bottoming cycle, for example to produce steam to drive a steam turbine in the bottoming cycle. The thermal energy storage system may be charged by any suitable source of heat, and may be discharged in multiple passes, with a first pass discharging heat at a first temperature, and second and any subsequent passes discharging heat at a second lower temperature and at subsequent still lower temperatures. If the heat discharged from storage is used to produce steam to drive a steam turbine in the bottoming cycle, the steam turbine may be operated in sliding pressure mode, with steam saturation temperature decreasing with discharge temperature from the thermal energy storage system and steam pressure decreasing with steam temperature. The steam produced from the thermal energy storage system may be superheated by heat transfer from the topping cycle exhaust. Discharging the thermal energy storage in this manner, combined with sliding pressure operation of the steam turbine, allows more complete use of the heat stored in the thermal energy storage system.

As non-limiting examples of such combined cycle power plants, this specification discloses solar hybrid power plants that utilize both solar energy and fossil fuels to generate electricity, and methods of operating those power plants, that may increase the solar energy fraction compared to conventional hybrid solar-fossil power plants to reduce the overall heat rate and carbon emissions, integrate solar thermal energy collection and storage with fast-start combustion turbines to provide dispatchable solar power with load following capability, and reduce the overall cost of solar thermal power. This may be achieved by synergistic arrangements of technologies, which may include the following.

Integration of the solar derived steam into the combined cycle using the solar thermal energy primarily or exclusively for latent heat transfer (evaporation), while reserving the heat from the turbine exhaust gas primarily or exclusively for sensible heat transfer (feedwater heating and steam superheating). Here "primarily" means ≥50%, ≥60%, ≥70%, ≥80%, ≥90%, ≥95%, or ≥99%. Eliminating or reducing extraction steam and feedwater heaters reduces first cost and enhances the load following capability of the power plant.

Integration of the solar derived steam into the combined cycle using the solar thermal energy primarily or exclusively to produce a first stream of saturated or slightly superheated steam, parallel generation of a second stream of saturated or slightly superheated steam using heat primarily or exclusively from the turbine exhaust gas, and production of superheated steam from the combined first and second streams of saturated or slightly superheated steam using heat primarily or exclusively from the turbine exhaust gas stream.

Use of low vapor pressure heat transfer fluids (HTFs), which permit thermal energy to be stored in low cost atmospheric storage tanks. Suitable HTFs may include paraffinic heat transfer fluids such as Duratherm 630™, for example, which are less hazardous and less expensive than the HTFs used in typical parabolic trough technology. The latter HTFs are also typically unsuitable for energy storage because their high vapor pressure would require very large and expensive pressure vessels.

Use of a low pressure (e.g., ≤about 75 bar, ≤about 70 bar, ≤about 65 bar, ≤about 60 bar, ≤about 55 bar, ≤about 50 bar, ≤about 45 bar or ≤about 40 bar) Rankine steam cycle with live steam conditions of, for example, about 70 bar/470° C. or about 60 bar/550° C., or about 45 bar/470° C., for which the boiling point is suitable for the low vapor pressure HTF, and for which the combustion turbine-generator (CTG) exhaust gases are readily able to provide the necessary superheat. These steam conditions may also eliminate the need for reheat, because the turbine exhaust moisture content may remain within acceptable limits, and may provide further cost savings by permitting the use of a single casing steam turbine, rather than separate high and low pressure turbines.

These arrangements may overcome several technical limitations with conventional approaches to solar thermal power plants, such as for example the following.

The maximum capacity of a conventional stand-alone solar thermal collection system is generally greater than the capacity of the steam turbine generator. Coupling a conventional thermal energy storage system will generally improve the capacity factor of the solar thermal system, but may not improve the economic utility because of the expense of the storage system, and the reduced steam temperature and cycle efficiency when operating from stored energy.

In a typical conventional solar-fossil hybrid combined cycle power plant designed to also operate without solar input, only about 5% of the gross electric power can be derived from solar thermal energy because flow and temperatures become sub-optimal when the solar steam is excessive. In contrast, solar hybrid power plants described in this specification may permit a 25% or larger fraction of electric power to be derived from the solar energy.

In a typical solar thermal plant employing parabolic trough technology, synthetic HTFs are required in order to deliver live superheated steam temperature of about 370° C. to achieve the needed Rankine cycle efficiency. In solar hybrid power plants described in this specification, more superheat may be obtained via the CTG exhaust gases, enabling higher efficiency. Further, the expense and environmental hazards of fluids such as Therminol® may be avoided.

Molten salt is typically used for thermal energy storage in a conventional solar thermal power plant because the synthetic HTF is too expensive to use for storage, and the vapor pressure of the synthetic HTF would require excessively large and expensive thick-walled pressure vessels. Molten salts require special and expensive materials, and expensive and energy consuming heat tracing to avoid freezing and prevent obstructions in the molten salt piping, instrumentation and valves. In addition, the salts require an additional heat exchanger which adds cost and reduces efficiency. By using low cost, non-toxic HTF with low vapor pressure, solar hybrid power plants described in this specification may avoid these difficulties.

These and other embodiments, features and advantages of the present invention will become more apparent to those skilled in the art when taken with reference to the following more detailed description of the invention in conjunction with the accompanying drawings that are first briefly described.

DETAILED DESCRIPTION

Figure 1:
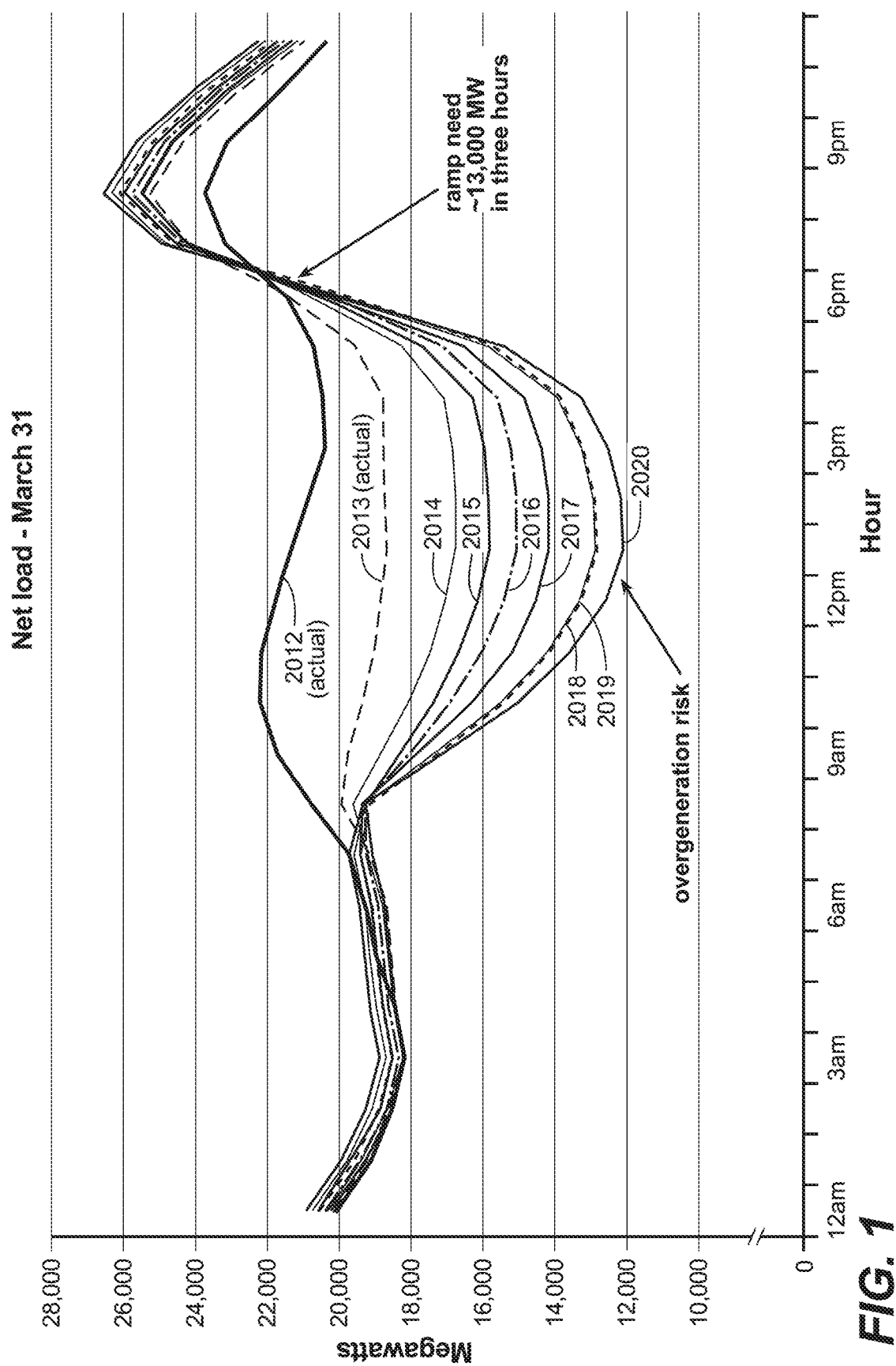
FIG. 1 shows plots of the California Independent System Operator Base Load as a function of time of day for Mar. 31, 2012 and 2013 (actual base load), and for Mar. 31, 2014-2020 (projected base load), colloquially known as 'the Duck Curve.'

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

As noted in the summary, this specification discloses combined cycle power plants comprising a thermal energy storage system that stores heat for use in the power plant's bottoming cycle. Such combined cycle power plants may be referred to in this specification as Dispatchable Storage Combined Cycle (DSCC) power plants. The bottoming cycle in a DSCC power plant may be, for example, a Rankine cycle employing a steam turbine.

In the DSCC power plants described in this specification, the thermal energy storage system may store heat in any suitable storage medium at any suitable temperature or range of temperatures. For example, the thermal energy storage system may store heat in a low vapor pressure heat transfer fluid (e.g., at a pressure of about one atmosphere) such as, for example, an (e.g., organic) oil or an inorganic molten salt, or in a high vapor pressure heat transfer fluid, or in any other suitable liquid. The thermal energy storage system may store heat in a solid such as, for example, graphite, metals, concrete (e.g., HEATCRETE provided by Heidelberg Cement AG and used in Energy Nest concrete storage modules), or aggregate. The thermal energy system may store heat in a gas or vapor such as, for example, steam. The thermal energy storage system may store heat as sensible heat, as latent heat (i.e., via a phase change), or as both sensible heat and latent heat.

The thermal energy storage system may be charged by any suitable source of heat. For example, solar energy may be collected as heat and stored in the thermal energy storage system, electric heaters (e.g., resistive or inductive electric heaters) may be used to provide heating for storage, or a fuel (e.g., a fossil fuel) may be combusted to produce the heat. If electric heaters are used, they may be powered with electricity generated with photovoltaic solar cells, with a solar thermal electric power plant, with a wind turbine, with a hydroelectric power plant, using nuclear power, by combusting a fossil fuel, by any suitable combination thereof, or by any other suitable method. The thermal energy storage system may be heated directly (e.g., by embedded electric heaters), or indirectly by a heat transfer fluid that transfers heat from the heat source to storage. In the latter case, suitable heat transfer fluids may include, for example, molten salts, steam, and oils, including high vapor pressures oils typically used by parabolic trough concentrating solar power systems.

The thermal energy storage system may be discharged in multiple passes, with a first pass discharging heat at a first temperature, and second and any subsequent passes discharging heat at a second lower temperature and at subsequent still lower temperatures. The heat discharged from storage may be used, for example, to produce steam, which is then superheated by heat transfer from the topping cycle, to drive a steam turbine in the bottoming cycle, with each pass producing steam at successively lower pressures. In such cases the steam turbine may be operated in sliding pressure mode, with saturated steam temperature decreasing with discharge temperature from the thermal energy storage system and steam pressure decreasing with steam temperature. Although the saturation temperature of the steam changes as the pressure slides, heat transfer from the topping cycle, and desuperheating sprays as needed, maintain the temperature of the superheated steam to the steam turbine.

As examples of DSCC power plants and their operation, this specification describes several dispatchable solar hybrid combined cycle power plants coupled with energy storage. These examples are meant to be illustrative, not limiting. That is, a DSCC power plant need not utilize solar energy. Instead, as noted above a DSCC power plant thermal energy storage system may be charged with heat from any suitable source.

When this specification refers to dispatchable solar hybrid combined cycle power plants, the hybrid aspect means that power may be derived from both solar and fossil energy sources. The combined cycle aspect means that power may be generated by both a Brayton topping cycle and a Rankine bottoming cycle. The dispatchable aspect means that thermal energy may be stored in order to produce power when the sun is not available.

Figure 2:
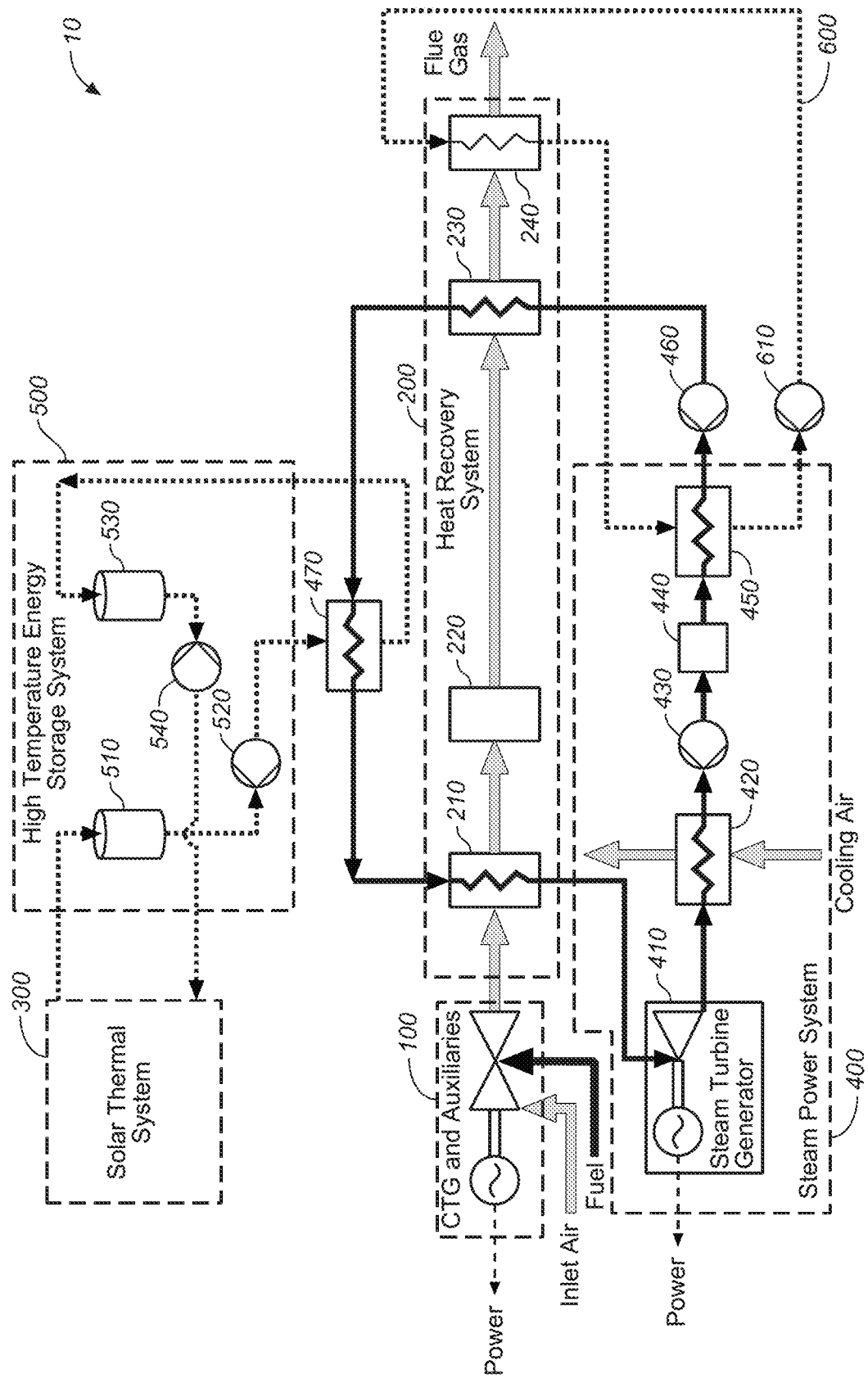
FIG. 2 schematically illustrates an example solar hybrid power plant.

FIG. 2 schematically illustrates an example solar hybrid power plant 10 comprising a combustion turbine generator 100, a heat recovery system 200, a solar thermal system 300, a steam power system 400, and a thermal energy storage system 500. As described in more detail below, heat from the combustion turbine generator exhaust gas collected in heat recovery system 200 and heat collected in solar thermal system 300 may be used separately or in combination to drive steam power system 400. Heat from solar thermal system 300, and optionally heat from other sources, may be stored in thermal energy storage system 500 for later dispatch to steam power system 400. Operation of solar hybrid power plant 10 is described below with reference to particular example temperatures, pressures, and flow rates. Any other suitable values for these parameters may also be used.

Referring again to FIG. 2, combustion turbine generator 100 may be a conventional combustion turbine generator operating on an open Brayton cycle in which atmospheric air is compressed and mixed with fossil fuel which is burned to produce hot gas that expands across a turbine. The compressor, turbine, and generator may be aligned along a rotating shaft, optionally with an intermediate gearbox to match the shaft speeds. Auxiliaries to the combustion turbine generator may include, for example, inlet air filtering and cooling systems, lubrication systems, control and condition monitoring systems, and ventilation and fire suppression equipment. The combustion turbine generator may be, for example, a Siemens SGT6-8000H, which is a modern 60 Hertz system with a gross rating of 274 Megawatts at 40% efficiency. Any other suitable combustion turbine generator may be used instead. Combustion turbine 100 may exhaust, for example, about 604 Kg/s of exhaust gas at about 617° C.

Exhaust gas from combustion turbine generator 100 is directed into heat recovery system 200, which extracts heat from the exhaust gas for use by the steam power system 400. Heat recovery system 200 includes heat recovery units (heat exchangers) disposed in the duct work connecting the combustion turbine generator with the chimney/stack of the power plant. The heat recovery units typically transfer heat from the exhaust gas to a fluid flowing through a coil.

Exhaust gas from the combustion turbine generator first flows through high temperature heat recovery unit (HTHRU) 210, which functions as a superheater to increase the temperature of steam generated in boiler 470 (further described below) while cooling the exhaust gas to, for example, about 405° C. The exhaust gas may then optionally flow through exhaust gas treatment systems such as a selective catalytic reduction (SCR) 220 system to reduce emissions of nitrogen oxides or a carbon monoxide catalyst. After the optional SCR 220, the exhaust gas flows through medium temperature heat recovery unit (MTHRU) 230, which functions as an economizer to warm feedwater for boiler 470 while further cooling the exhaust gas to, for example about 160° C. The exhaust gas then flows through low temperature heat recovery unit (LTHRU) 240, which captures heat used to preheat the boiler feedwater prior to passage of the boiler feedwater through MTHRU 230 and further cools the exhaust gas to, for example, about 60° C. The exhaust gas is then discharged up the stack/chimney.

Solar thermal system 300 concentrates sunlight onto a heat collector through which a heat transfer fluid flows to receive energy in the form of sensible or latent heat. Solar thermal system 300 may be or comprise, for example, a linear focus system using parabolic trough or compact linear Fresnel reflector technology, or may be a dish or tower type concentrating solar thermal energy collector. Solar thermal system 300 may employ, for example, Solar Reserve Inc. molten salt tower solar energy collectors, Bright Source Energy, Inc. direct steam tower solar energy collectors, AREVA Solar Inc. CLFR solar steam generators, or conventional parabolic trough heat collector elements. Any suitable solar thermal energy collectors may be used in solar thermal system 300. Intermediate heat transfer fluid storage tanks and pumps (not shown) may be arranged within solar thermal system 300 to facilitate operations and maintenance.

Thermal energy storage system 500 stores thermal energy as sensible heat in a low vapor pressure liquid heat transfer fluid. As used herein the term "low vapor pressure liquid heat transfer fluid" refers to a heat transfer fluid having a vapor pressure less than about 0.1 atmosphere, or less than about 0.5 atmosphere, or less than about 1.0 atmosphere, at a temperature of about 300° C., or about 330° C., or about 350° C. Hot heat transfer fluid stored in thermal energy storage system 500 may be used when needed to provide heat to steam power system 400 (e.g., to boiler 470).

The use of low vapor pressure heat transfer fluid in thermal energy storage system 500 permits the hot liquid to be stored in thin-wall insulated tanks at about atmospheric pressure. In contrast, conventional parabolic trough based solar thermal systems typically use fluids such as Therminol®, which are not suitable for thermal energy storage because their vapor pressure would require the use of pressure vessels, which are impractical for the large volumes that may be desired.

As noted above in the summary section, one heat transfer fluid suitable for use in thermal energy storage system 500 is the paraffinic heat transfer fluid Duratherm 630™, which is both less toxic and lower cost than the commonly used solar thermal fluids such as Therminol®. Duratherm 630™ has a vapor pressure of about 0.1 atmospheres at about 316° C. Caloria HT-43 (a petroleum distillate) is another suitable heat transfer fluid. Other heat transfer fluids with low vapor pressure may also be used, including other paraffinic heat transfer fluids and molten salts, subject to technical and economic considerations related to heat transfer fluid cost, the cost of compatible piping, tanks, valves and pumps, environmental and fire hazards, the freezing point and the cost of heat tracing for low temperature operation or extended non-operating periods, the stability of the heat transfer fluid at high temperature, and the quantity of fluid required, based on the density and specific heat.

Sensible heat may be added directly to the low vapor pressure heat transfer fluid in thermal energy storage system 500 by solar thermal system 300 by pumping cold heat transfer fluid through solar thermal system 300. A control system may regulate the flow rate of the heat transfer fluid through the solar thermal system to achieve a desired temperature.

Alternatively, or in addition, sensible heat may be added indirectly to the low vapor pressure heat transfer fluid in thermal energy storage system 500 from solar thermal system 300 by pumping cold heat transfer fluid through a heat exchanger to receive heat from a higher temperature fluid circulated through solar thermal system 300. This may involve, for example, sensible heat transfer from a high vapor pressure heat transfer fluid (such as Therminol®) heated to about 400° C. in a conventional parabolic trough solar energy collector, or sensible heat transfer from a molten salt in the case of tower or novel linear technologies.

Alternatively, this could involve latent heat transfer from steam condensation. For example, solar steam condensing at about 132 bar would heat the low-vapor pressure heat transfer fluid to about 332° C., which is the maximum operating temperature of Duratherm 630®.

Such indirect heating may reduce technology risk by using proven commercial technology and may also be a cost effective means of upgrading an existing solar thermal power plant to a dispatchable hybrid plant.

Sensible heat may also be added to the heat transfer fluid in thermal energy storage system 500 by non-solar sources. Non-solar heating may involve pumping the low vapor pressure heat transfer fluid through a heater or heat exchanger, for which the source of energy may be or include, for example, hot combustion exhaust gases from combustion turbine generator 100, or hot combustion gases from another gas turbine co-located with solar hybrid power plant 10. For example, a second combustion turbine generator could be provided for peaking service. Instead of utilizing a heat recovery steam generator, the exhaust gas from the second combustion turbine generator could flow across heat exchangers to transfer heat from the hot exhaust gas to a low vapor pressure heat transfer fluid which may then be stored in tanks. This arrangement could supplement the energy stored by a solar collection system, or could be employed instead of a solar collection system. The latter case is similar to a two-on-one combined cycle plant, where two combustion turbine generators and heat recovery steam generators feed a single steam power cycle, but provides for time shifting of the power generation in the bottoming cycle. The low vapor pressure heat transfer fluid could be heated directly in the exhaust stream or indirectly by, for example, condensing steam produced by a heat recovery steam generator.

Alternatively, non-solar heating may use for example a fossil fuel burner, process heat, or electric heating. In the latter case the electric heating of the low vapor pressure heat transfer fluid may store electricity generated at remote locations at inopportune or uneconomic times, with discharge at more favorable times. The electric heating may be produced, for example, from solar PV or wind generation, including over-generation as shown in FIG. 1.

Hot and cold low vapor pressure heat transfer fluid in thermal energy storage system 500 may be stored for example in dedicated hot and cold tanks (as illustrated), in one or more thermocline tanks in which hot heat transfer fluid is stored above cold heat transfer fluid in the same tank, or in tanks that may be used alternatively for hot or cold storage. The latter two approaches may be suitable if the sensible heating and cooling of the tank and associated piping is inconsequential compared to the economic savings achieved by reducing the number of tanks required. Filling, draining, and ullage of tanks and tank farms may follow conventional practice.

The hot and cold low vapor pressure heat transfer fluid in thermal energy storage system 500 is typically stored at about atmospheric pressure. Thermal energy storage system 500 may operate between about 330° C. (hot heat transfer fluid) and about 250° C. (cold heat transfer fluid). Any other suitable temperature range may also be used.

Referring again to the example of FIG. 2, when heat is available from solar thermal system 300 a pump 540 may draw cold heat transfer fluid at a temperature of, for example, about 265° C. from low temperature storage tank 530, pump it through solar thermal system 300 for heating and then to high temperature storage tank 510, where it is stored at a temperature of, for example, about 330° C. Pump 520 may pump hot heat transfer fluid from high temperature storage tank 510 through boiler 470 to heat boiler feedwater to generate steam, and then back to low temperature storage tank 530. Alternatively, or in addition, heat transfer fluid may be pumped from boiler 470, through solar thermal system 300 for heating, and then back to the boiler to generate steam. That is, one or both of the heat transfer fluid storage tanks may optionally be bypassed. Hot heat transfer fluid may be supplied to boiler 470 in various proportions as desired from hot storage tank 510 or directly from solar thermal system 300.

In steam power system 400, superheated steam (generated as described below) is delivered to steam turbine generator (STG) 410, for example at design conditions of about 70 bar/470° C. and a flow rate of about 250 kg/s. This design condition allows use of a compact single-casing turbine without reheat, because the expanded steam will not have excessive moisture (liquid content) in the last stage of the turbine. Reheating of the steam may be avoided to save cost, and elimination or reduction of extraction steam for feedwater heating enhances load following and permits all or more of the steam to perform useful work.

After expanding through the turbine, steam is condensed to liquid water, typically using an air-cooled condenser 420 at an annual average condensing temperature of, for example, about 40° C., which corresponds to an exhaust pressure of about 0.085 bar. Under these conditions, a steam flow of about 250 kg/s may generate approximately 225 Megawatts of electric power.

Condensing temperature varies depending on the cooling capacity, with lower condensing temperature permitting higher net power generation. Water cooling, if available, would increase the net power generation by reducing the condensing pressure, and eliminate or reduce power consumed by the fans of the air cooled condenser.

Heat derived from the combustion turbine generator exhaust gases using low temperature heat recovery unit 240 described above is used to raise the condensate temperature from about 40° C. to about 105° C., for example. At an example water (steam) flow rate of about 250 kg/s this may require, for example, about 65 MW of heating. The condensate may be either directly heated by circulating it through low temperature heat recovery unit 240 or indirectly heated.

In the illustrated example, a condensate pump 430 transfers the condensed water from condenser 420 through an optional condensate polishing unit 440 and into a feedwater heater 450. The condensate is then indirectly heated with a low temperature heat transfer loop 600 that circulates a heat transfer fluid through low temperature heat recovery unit 240 to collect heat and delivers the collected heat to feedwater heater 450. Feedwater heater 450 may be for example a closed feedwater heater. Alternatively, feedwater heater 450 may be an open deaerating feedwater heater and the heat transfer fluid in loop 600 may be used to produce low pressure pegging steam delivered to the feedwater heater. Pegging or heating steam may in addition or alternatively be drawn from any other suitable location in steam power system 400.

Indirect feedwater heating as just described may provide operational flexibility to overcome transient mismatches between the heat available in the combustion turbine generator exhaust gas and the heat required for feedwater heating, particularly during startup and load following. For example, optional intermediate storage tanks in low temperature heat transfer loop 600 may hold heat transfer fluid to manage such transient mismatches between the availability of heat in the exhaust gas and the need for feedwater heating.

Referring once more to the example of FIG. 2, boiler feedwater pump 460 supplies water from feedwater heater 450 to medium temperature heat recovery unit 230 at a pressure of about 75 bar, for example. Medium temperature heat recovery unit 230 raises the temperature of the feedwater from about 105° C. to about 255° C., for example, by heat transfer from the combustion turbine generator exhaust gas.

The heated water then enters boiler 470, where it evaporates to produce saturated steam at a temperature of about 288° C. and a pressure of about 70 bar, for example. At a water (steam) flow rate of about 250 kg/s this may require, for example, about 425 MW of heating provided from solar thermal system 300, from thermal energy storage system 500, or from a combination of solar thermal system 300 and thermal energy storage system 500. This would require about 2350 kg/s of heat transfer fluid if Duratherm 630™ were used to supply heat to boiler 470 at an input heat transfer fluid temperature of about 330° C. and an output heat transfer fluid temperature of about 265° C.

Boiler 470 may utilize for example a once-through arrangement to facilitate rapid startup and load following, or a recirculating drum-type boiler may be used. Boiler 470 may optionally superheat the steam slightly, to about 290° C. for example.

The steam generated in boiler 470 flows to high temperature heat recovery unit 210, where the steam is further superheated to a temperature of, for example, about 470° C. This superheated steam is expanded across steam turbine generator 410 to generate power, and then condensed as described above.

As just described, solar hybrid power plant 10 may operate as a combined cycle power plant generating electric power with combustion turbine generator 100 and additional electric power with steam turbine generator 410. The combustion turbine generator power output is determined primarily by the fuel flow, and may be rated for example at about 275 MW. The steam turbine generator power output is determined primarily by the steam flow.

When there is energy available from thermal energy storage system 500 and/or solar thermal system 300 to heat boiler 470, the combustion turbine generator exhaust gas may be used primarily for single phase heat transfer to warm water before it enters boiler 470, and to superheat steam produced in boiler 470, as described above. Under these circumstances steam flow to boiler 470 may be about 250 kg/s at conditions of about 70 bar/470° C., for example, and the steam turbine generator electric power output may be about 225 MW. With a 275 MW combustion turbine generator the overall plant may then produce about 500 MW of electric power, for example.

Power plant 10 may also be operated as a combined cycle power plant without using the thermal energy storage system, by bypassing boiler 470 and for example using medium temperature heat recovery unit 230 and high temperature heat recovery unit 210 in series as a once through steam generator. In such cases the steam flow to the steam turbine generator will be reduced, for example from about 225 kg/s with boiler 470 to about 100 kg/s without boiler 470. With the lower flow rate but the same steam turbine throttle temperature of about 470° C., the steam turbine inlet pressure is reduced from about 70 bar to about 30 bar and the electric power output is reduced from about 225 MW to about 80 MW, so with a 275 MW combustion turbine generator the overall plant produces about 355 MW of electric power, for example.

Power plant 10 may also be operated as a combined cycle power plant at intermediate steam turbine generator operating conditions, with some steam produced by boiler 470.

Power plant 10 may also be operated as a simple cycle power plant, by not flowing water into heat recovery system 200, which is acceptable for some once through boiler designs, or by bypassing the combustion turbine generator exhaust gas around heat recovery system 200. In this case, the power plant produces electric power with the combustion turbine generator but not with the steam turbine generator. The overall power may then be, for example, about 275 MW.

It is important to note that fuel consumption is unchanged in the several operating modes just described, so the cost of power ($/MW-hour) and the heat rate (BTU/kw-hr) increase as the power output decreases.

Figure 3:
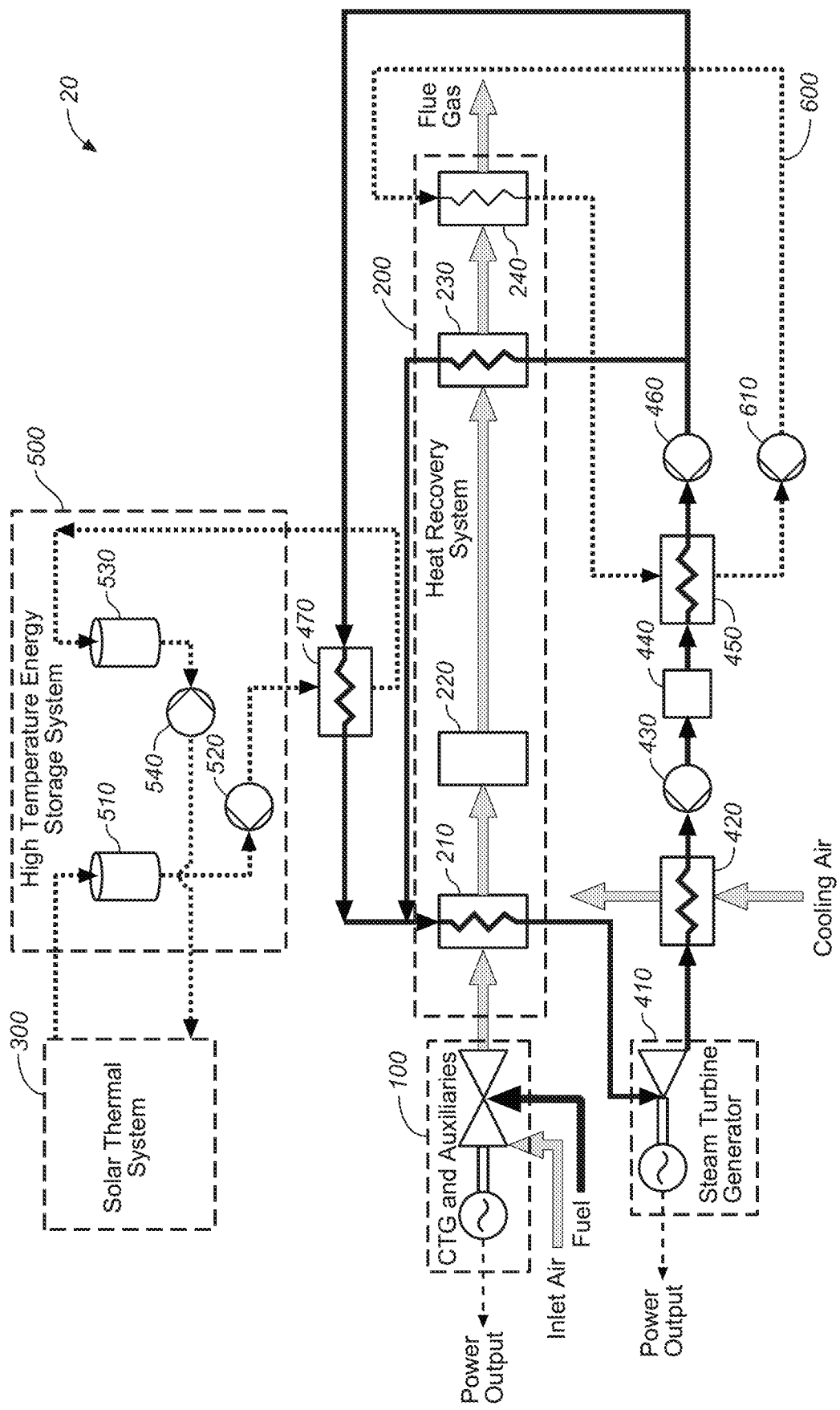
FIG. 3 schematically illustrates another example solar hybrid power plant.

In another embodiment of a dispatchable solar hybrid combined cycle power plant, shown in FIG. 3 and referred to as power plant 20, the feedwater from pump 460 is split into two streams, one of which flows to MTHRU 230 and the other of which flows to Boiler 470. Both streams are boiled, one using heat from the exhaust gas and the other using heat stored in the low vapor pressure heat transfer fluid. In this embodiment, MTHRU 230 and boiler 470 are arranged in parallel in the steam circuit, and MTHRU 230 produces steam at about the same temperature and pressure as that produced in boiler 470, that is, saturated or slightly superheated steam. Boiler 470 may produce steam at for example about 3 to about 6 times the rate at which steam is produced in parallel in MTHRU 230. Steam from Boiler 470 is mixed with steam from MTHRU 230 and enters HTHRU 210, where the mixed steam is superheated before entering Steam Turbine 410.

Tables 1A-1G provide example flow rates, pressures, temperatures, and other parameter values for operation of power plant 20 described above. Any other suitable values for these parameters may also be used.

In this embodiment heating duty is displaced from MTHRU 230 to boiler 470. By shifting the heating duty in this manner, more of the energy stored in the low vapor pressure heat transfer fluid can be extracted because the heat transfer fluid can be cooled to a lower temperature, potentially reducing the volume of heat transfer fluid to be stored in tanks. In addition, shifting heating duty to boiler 470 can reduce the average temperature of heat transfer fluid circulating in the solar field and consequently reduce heat losses.

This embodiment may simplify the design and operation of MTHRU 230, because it always includes an evaporating section, whether or not energy is available from the energy storage system.

In power plant 10 (FIG. 2) and power plant 20 (FIG. 3), without steam production at normal operating temperature and pressure from the heat transfer fluid (e.g., after all of the hot heat transfer fluid in storage is consumed), the steam turbine inlet pressure may be reduced during sliding pressure operation to maintain approximately constant volumetric flow through the turbine. At the reduced turbine throttle pressure, the saturation temperature of steam is also reduced, for example to about 234° C. at about 30 bar.

Alternatively, or in addition, additional thermal energy may be extracted from the heat transfer fluid during sliding pressure operation. After heat has been extracted from the heat transfer fluid to evaporate steam during full pressure operation, the temperature of the heat transfer fluid may still be sufficient to boil additional steam at the reduced operating pressure during part load operation. This may be done for example by reversing the flow of heat transfer fluid so that it passes from the cold tank, through boiler 470, and then to the hot tank, or by circulating the heat transfer fluid from the cold tank, through boiler 470, and then back to the cold tank, or in any other suitable manner.

For example, in some variations the heat transfer fluid (e.g., Caloria HT-43) may be heated to about 300° C. by the solar field and used to produce steam at about 35 bar in boiler 470 and/or stored in hot tank 510. To continue power generation without coincident solar thermal input from the solar field to the steam system (for example at night) the heat transfer fluid is circulated from the hot tank through boiler 470, where the heat transfer fluid may be cooled to about 250° C., for example, and then stored in cold tank 530. The steam from boiler 470 and from MTHRU 230 is mixed and superheated in HTHRU 210 from about 250° C. to about 415° C., for example, and then expanded through steam turbine generator 410 to produce power. For example, boiler 470 may produce about 126,000 pounds/hour of saturated steam which is mixed with about 21,000 pounds/hour of saturated steam produced by MTHRU 230, superheated, and then expanded through the steam turbine generator to produce about 14.6 MW of electric power.

When the volume of hot heat transfer fluid stored in hot tank 510 is consumed, steam turbine generator 410 can continue to operate at lower power using the steam produced in MTHRU 230, optionally plus some additional steam produced by a desuperheater used to limit the steam temperature. As noted above, approximately the same volume of steam would enter the steam turbine generator, so its throttle pressure would be reduced to about 6 bar, for example, and the steam turbine generator would produce less power, for example about 2 MW.

Alternatively, or in addition, "cold" heat transfer fluid in cold tank 530 (at about 250° C., for example) could be used to generate more steam at a lower pressure in boiler 470 in parallel with MTHRU 230 to increase the steam turbine generator power output. For example, boiler 470 may produce about 2200 pounds/hour of saturated steam at about 11.4 bar, which would then be mixed with steam from MTHRU 230, also at about 11.4 bar and superheated about 415° C. and expanded through the steam turbine generator to produce about 4 MW.

Figure 4:
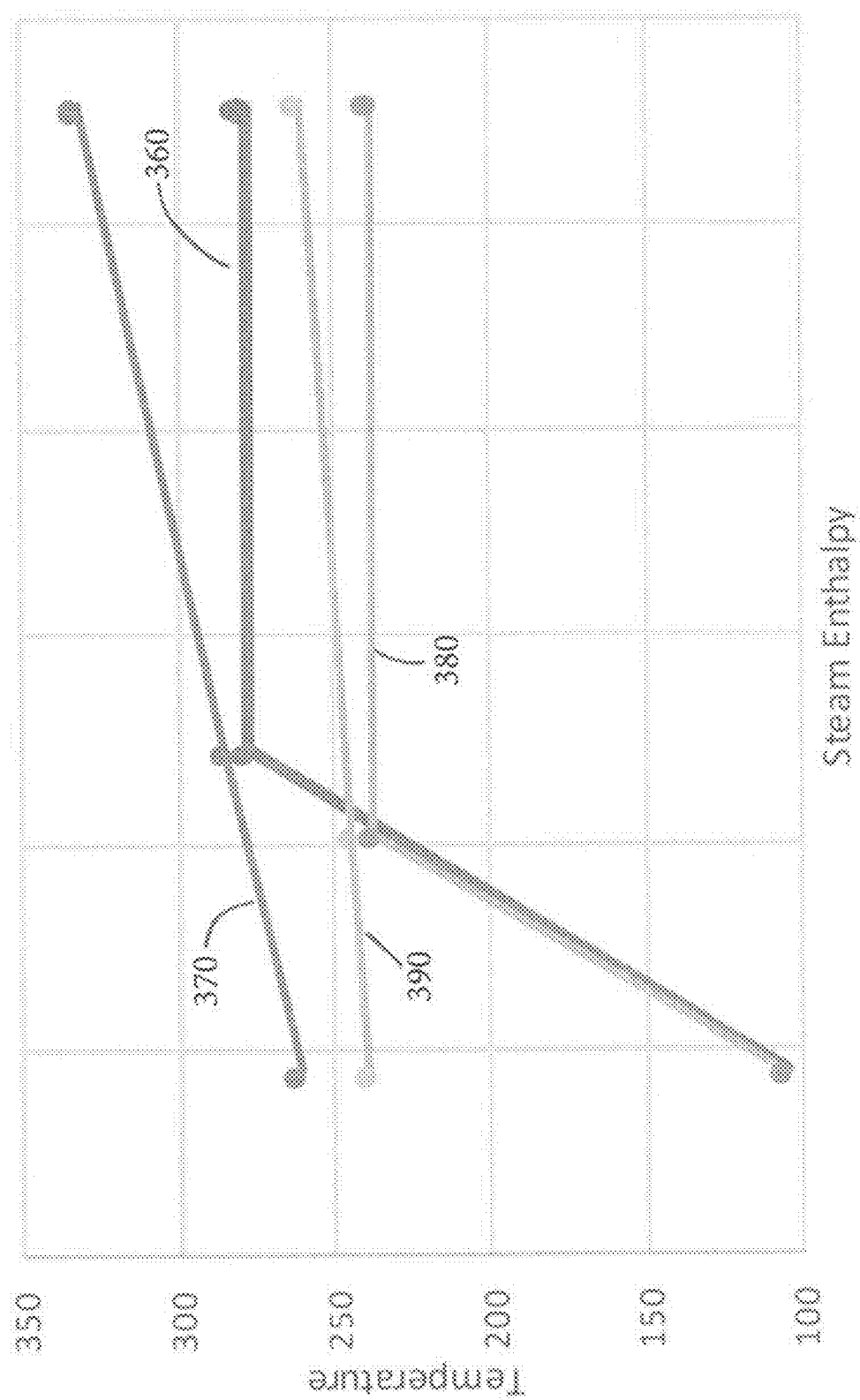
FIG. 4 plots temperatures for steam and heat transfer fluid during discharge of heat from a thermal energy storage system for nameplate and part load operation of an example solar hybrid power plant.

The flow rate of steam must satisfy the laws of thermodynamics, which establishes a pinch point, or minimum approach temperature difference between the heat transfer fluid and the steam in boiler 470 as illustrated in FIG. 4, which shows the temperature of steam and heat transfer fluid for the nameplate conditions of Tables 1A-1G and a part-load condition shown in Tables 3A-3G. In FIG. 4, plot 360 is for 62.2 bar steam, plot 370 is for heat transfer fluid in a first pass discharge of heat from thermal energy storage (e.g., from the hot tank), plot 380 is for 32 bar steam, and plot 390 is for heat transfer fluid in a second pass discharge of heat from thermal energy storage (e.g., from the cold tank).

At part-load conditions, an additional mechanical constraint is imposed, namely that the volumetric flow rate into steam turbine generator 410 is approximately unchanged from the nameplate condition, requiring both lower steam pressure, density, and mass flow rate. With less steam mass flow through heat recovery system 200, the gas temperatures are higher, and the steam flowing through HTHRU 210 may require de-superheating to avoid exceeding metal temperatures. Desuperheating, using high pressure subcooled water from the boiler feedwater pump 460 is a common practice, and is not shown in FIGS. 2 and 3 for simplification.

The pinch point and flow rate of heat transfer fluid to boiler 470 from the hot tank (in the case of Tables 1A-1G) or cold tank (in the case of Tables 3A-3G) or cold tanks to the boiler 470 is the same. These conditions result in equal duration of storage and operating time at the full load and part-load conditions. Alternatively, the part-load steam pressure and steam turbine generator power output could be further reduced, which would allow the flow rate of heat transfer fluid to be reduced, thereby extending the duration of part-load operation still further. Many combinations of part-load pressure and operating duration are possible, subject to the thermodynamic and volumetric flow constraints.

There are also heat transfer constraints to be satisfied under the two operating conditions, that is, there must be sufficient heat transfer under both the nameplate and part-load conditions. Newton's law of cooling states that the heat transfer rate (kW) is promotional to the temperature difference times the heat transfer area. The coefficient of proportionality, or Heat Transfer coefficient, is largely dependent on Reynolds Number, which is roughly constant because the volumetric flow rate is constant during sliding pressure operation. Accordingly, heat transfer performance at the part-load condition is not constraining.

Figure 5:
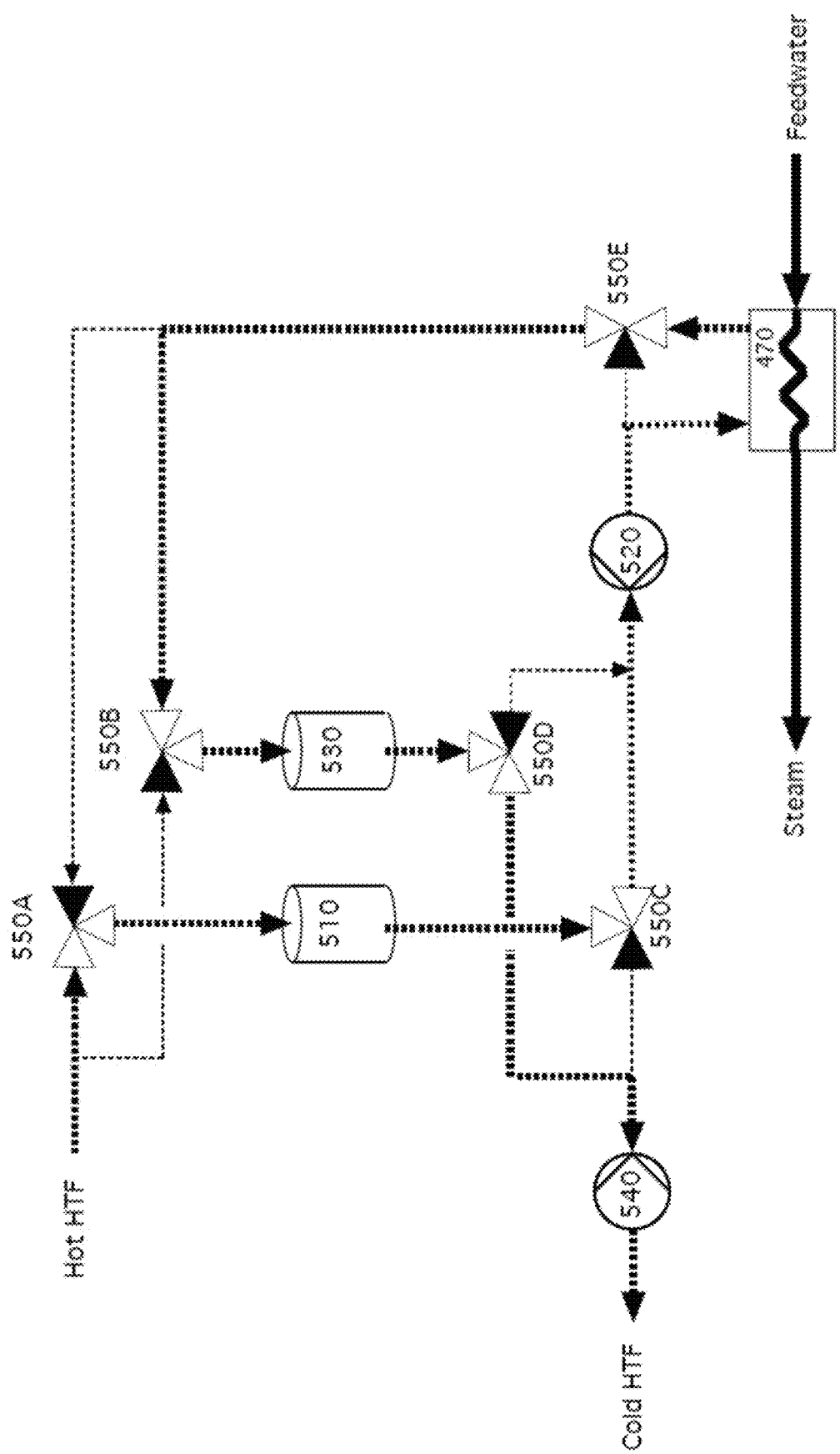
FIG. 5 schematically illustrates an example configuration for a thermal energy storage system.

FIG. 5 shows a schematic of an example configuration of thermal energy storage system 500, with three-way valves 550A-E inserted to direct the flow of heat transfer fluid to and from storage tanks 510 and 530. The three-way valves are illustrative, and alternative arrangements of valves and manifolds could be used to achieve the same result. The diagram shows the "normal" flow arrangement previously described and shown in FIGS. 2 and 3, with cold heat transfer fluid flowing from cold tank 530 through valve 550D to pump 540 and thence to a solar field for heating. The heated heat transfer fluid returns from the solar field and flows through valve 550A into hot tank 510. When the solar field is unavailable, pump 540 would be turned off.

To produce steam at the nameplate pressure, heat transfer fluid would flow from hot tank 510 through valve 550C to pump 520, through boiler 470. The cooled heat transfer fluid then returns to cold tank 530 via valve 550E and valve 550B. To operate at part-load when the heat transfer fluid is depleted in hot tank 510, the valve positions would be changed, so that heat transfer fluid would flow out of the cold tank 530, through valve 550D to pump 520 and boiler 470, to return via valve 550E and valve 550A to hot tank 550A.

It would be possible to continue heat storage discharge operation at still lower saturated steam temperature and steam pressure by restoring the valves to the original configuration.

Valve 550E allows heat transfer fluid to bypass boiler 470, for maintenance purposes, such as transferring heat transfer fluid between tanks.

The arrangement described in FIG. 5 applies to Plant 10 or Plant 20 or any number of variants. Three or more tanks could be used in a round-robin fashion, or multiple tanks could be operated in parallel arrangements. For example, a multiple tank system might dedicate the lowest temperature tank to feedwater heating, and reserve higher temperature tanks for boiling steam in order to improve the exergetic efficiency.

Moreover, this multiple pass approach can extend the operation of thermal energy storage systems employing media other than low vapor pressure heat transfer fluids, including for example any of the example thermal energy storage media described above. The temperatures at which heat is discharged from the thermal energy system, the range of temperatures over which discharge occurs, and the number of passes (i.e., the number of discharge cycles before the heat storage is recharged) may depend on the particular heat storage medium used.

The heat rate for various operating conditions of one example of power plant 20 is tabulated in Table 2 below. In this table "DSCC" indicates operation of the combustion turbine generator and also operation of the steam turbine generator using heat from "hot" heat transfer fluid from the solar field and/or heat from thermal energy storage in combination with heat from the combustion turbine generator, "CTG only" indicates that the steam turbine generator is not operated, "CTG+HRSG" indicates operation of the combustion turbine generator and also operation of the steam turbine generator using heat only from the combustion turbine generator and not from the solar field or thermal energy storage, and "Cold Tank Use" indicates operation of the combustion turbine generator and also operation of the steam turbine generator using heat from "cold" heat transfer fluid from thermal energy storage in combination with heat from the combustion turbine generator. As shown in Table 2, the heat rate for power plant 20 may be exceptionally low in normal operation. Operating at part load as described above ("Cold Tank Use" or "CTG+HRSG"), the heat rate may be comparable to that of a modern conventional combined cycle power plant. Accordingly, the arrangement and operation of DSCC power plant 20 described above can increase the plant capacity and the utilization of thermal energy storage and improve the heat rate.

As noted above, although plant 10 and plant 20 employ a solar thermal system 300 as a heat source for their bottoming cycles, any other suitable heat source may be used instead of solar thermal energy. Different heat sources may store heat in the thermal energy storage system at different maximum storage temperatures. Combinations of heat sources, thermal energy storage system heat storage media, and thermal energy storage system configuration may be selected to produce and store heat at desired temperatures. The bottoming cycle may then be operated at a sequence of temperatures and pressures to advantageously use the stored heat, similarly to plant 10 and plant 20 as described above.

Figure 6:
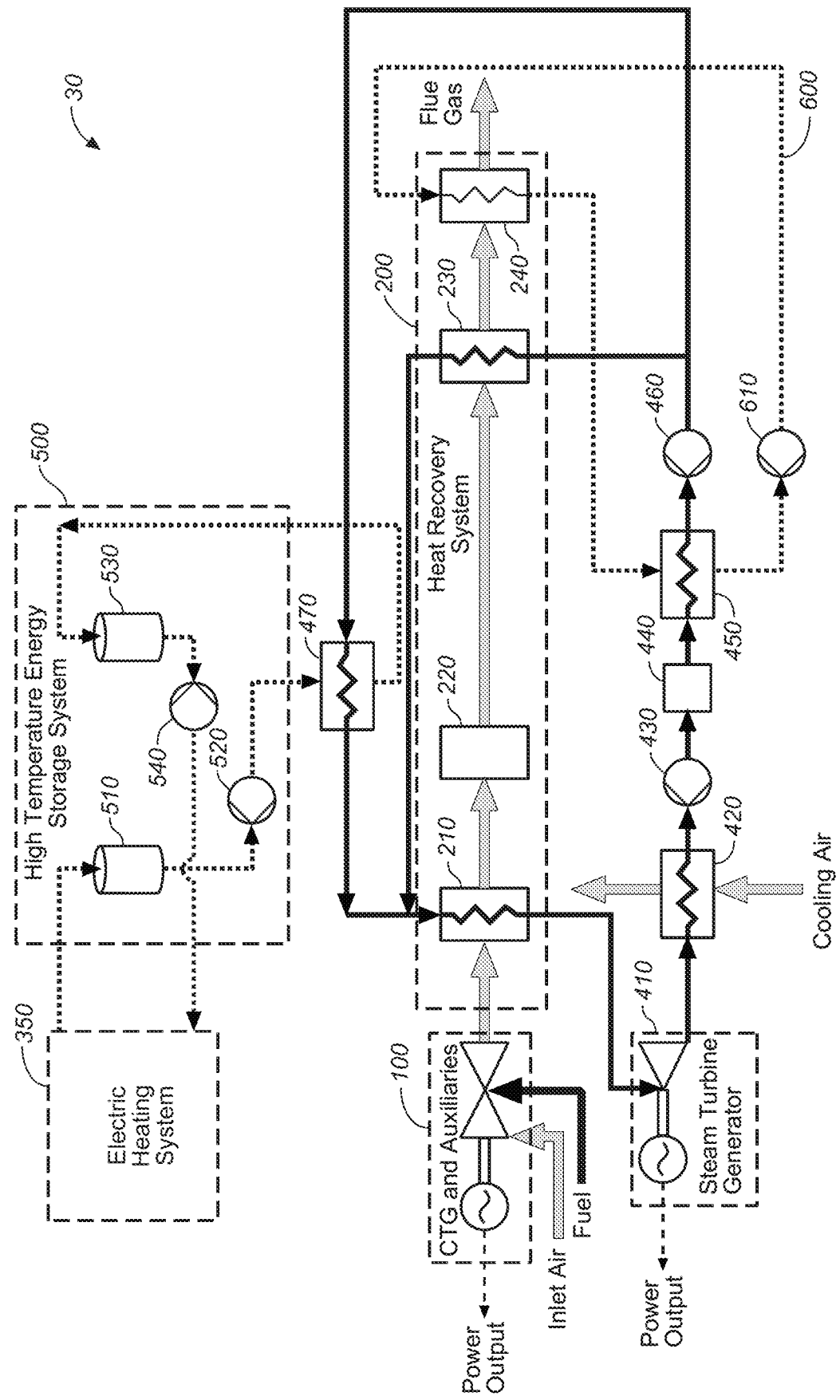
FIG. 6 schematically illustrates a dispatchable storage combined cycle power plant similar to the solar hybrid power plant of FIG. 3, with the solar thermal system replaced by an electric heating system.

As an additional example DSCC power plant, FIG. 6 shows a power plant 30 that is very similar to power plant 20 of FIG. 3 in configuration and operation, except that power plant 30 comprises an electric heating system 350 in place of solar thermal system 300.

Electric heating system 350 uses resistance or inductive heating to transform electric energy to thermal energy for storage in high temperature energy storage system 500. Electricity may be delivered to electric heating system 350 from any suitable power generation source such as, for example, a fossil fuel fired power plant, a nuclear power plant, a wind turbine power plant, and a thermal or solar photovoltaic solar power plant. The electricity may be produced adjacent to plant 30, at a distance from plant 30 and transmitted to plant 30 over an electrical grid, or may be a combination of local and remotely generated power. Electric power may be produced or transmitted at any suitable voltage as either alternating current (AC) or direct current (DC). Electric heating system 350 may use the power in the form delivered, or may transform or convert it to a voltage and waveform more suitable for the control of power delivery.

The flow of heat transfer fluid from cold tank 530 to electric heating system 350 may be regulated in proportion to the electric power delivered to electric heating system 350 by pump 540 in order to establish a desired temperature of the heat transfer fluid returning to hot tank 510. The regulation of flow rate may be performed by varying the speed of pump 540, or by the use of control valves to recirculate excess heat transfer fluid back to cold tank 530. With the methods just described, the electric heating system 350 may readily store time-varying quantities of electric energy to facilitate balancing of electric supply and demand.

The temperature of the heat transfer fluid returning to hot tank 510 may also be regulated by adjusting the amount of electric energy delivered to electric heating system 350, using any suitable temperature control means, such as connecting or interrupting electric heaters (also known as on-off control), or proportional control means such as varying the voltage and/or current delivered to electric resistance heaters within electric heating system 350.

Electric heating system 350 may be used to achieve higher temperatures than would be possible with a solar thermal system 300 based on oil-based parabolic trough technology, which is typically limited to about 390° C. Electric heating system 350 may, for example, heat molten salt to a temperature of about 565° C., as practiced with some tower and linear solar thermal systems. Electric heating system 350 could also be used to store energy at very high temperature, for example in the phase change of metals, as is done in electric arc furnaces for steel making, which achieve temperature of 1800° C. or more.

The storage temperature is constrained by the materials limitations of both the storage medium and the container and supporting systems. For example, a molten salt may be chemically unstable at high temperatures, which limits solar thermal storage to about 565° C. At high temperature, molten salts may also be corrosive to steels used in tanks, piping, pumps, heaters, valves, and instruments, which might necessitate the use of expensive alternate materials. Accordingly, reliability and economic considerations may limit the temperature of the heat transfer fluid exiting electric heating system 350.

Molten salts used as heat transfer fluids are also constrained at lower temperatures where viscosity increases pumping power requirements and there is a risk of freezing. Molten salt formulations used in tower concentrating solar power applications have a typical operating temperature range of 250° C. to 565° C.; medium temperature formulations are available with an operating temperature range of 140° C. to 485° C. Either formulation would permit a higher efficiency DSCC implementation at 70 bar rated steam pressure, with the simple non-reheat configuration. The 250° C. operating limit of the higher temperature salt would limit sliding pressure operation to about 40 bar, whereas the lower temperature salt would permit operation down to about 4 bar.

The higher temperature produced by electric heating system 350 increases the density of energy storage within hot tank 510, which may permit a smaller and less costly tank, and a smaller quantity of storage media. A figure of merit in evaluating heat transfer fluids for energy storage is the product of density and specific heat, which has units of kiloJoules per cubic meter per degree. Accordingly, increasing the temperature range over which the storage operates also increases the useful stored energy. Parameters of some commercially available heat transfer fluids and heat storage media are shown below in Table 4.

In addition to using a heat transfer fluid as a heat storage medium, as noted above heat transfer fluids can be used to transfer heat into or out of solid heat storage media, such as the concrete media available from EnergyNest or the graphite media available from Graphite Energy. The figure of merit of the EnergyNest system in Table 4 was derived from the energy claimed to be stored within their module over the entire temperature range. To take full advantage of the high temperature capacity of graphite, the graphite heat storage modules could be electrically heated, for example by embedding resistive heating elements. The additional heat stored at high temperature could be transferred to boiler 470 by reducing the flow rate of heat transfer fluid from hot tank 510 and employing a higher temperature drop before returning heat transfer fluid to cold tank 530. Alternatively, the flow rate of heat transfer fluid could be maintained approximately constant during both the normal operating pressure case and the part load case, as shown in Table 1A and Table 3A.

More generally, a method of operating a DSCC power plant such as power plant 10, power plant 20, or power plant 30, for example, may comprise operating a combustion turbine generator to generate electricity and produce hot exhaust gases, and storing heat from a heat source other than the combustion turbine generator in a thermal energy storage system at a temperature T1. In a first mode of operation the method may comprise producing steam in a first boiler by heating feedwater with heat supplied at temperature T1 from the thermal energy storage system by a heat transfer fluid, thereby cooling the heat transfer fluid, storing heat from the cooled heat transfer fluid in the thermal energy storage system at a temperature T2<T1, heating the steam from the first boiler with heat from the combustion turbine exhaust gases to produce superheated steam at pressure P1, and expanding the superheated steam at pressure P1 through the steam turbine generator to generate electricity.

In a second mode of operation, after depleting the thermal energy storage system of heat stored at temperature T1, the method may comprise producing steam in the first boiler by heating feedwater with heat supplied from the thermal energy storage system at a temperature of T2 or less by a heat transfer fluid, heating the steam from the first boiler with heat from the combustion turbine exhaust gases to produce superheated steam at pressure P2<P1, and expanding the superheated steam at pressure P2 through the steam turbine generator to generate electricity. The temperature of the superheated steam may be controlled or limited by suitable means, such as a water spray at temperacor.

The pressures P1 and P2 may be controlled by the rate at which heat is supplied from the thermal energy storage system to the boiler, for example by controlling a heat transfer fluid flow rate to control the rate at which heat is supplied from the thermal energy storage system to the boiler.

In both the first mode of operation and the second mode of operation, the method may comprise preheating the feedwater with heat from the combustion turbine exhaust gases.

The first mode of operation may comprise producing steam in a second boiler operated in parallel with the first boiler by heating feedwater with heat from the combustion turbine exhaust gases, mixing the steam from the first boiler with the steam from the second boiler, and heating the mixture of steam from the first boiler and steam from the second boiler with heat from the combustion turbine exhaust gases to produce the superheated steam at pressure P1. Similarly, the second mode of operation may comprise producing steam in the second boiler operated in parallel with the first boiler by heating feedwater with heat from the combustion turbine exhaust gases, mixing the steam from the first boiler with the steam from the second boiler, and heating the mixture of steam from the first boiler and steam from the second boiler with heat from the combustion turbine exhaust gases to produce the superheated steam at pressure P2. Optionally, in these variations of the first and second modes of operation the first boiler may produce steam using heat exclusively from the thermal energy storage system and the second boiler may produce steam using heat exclusively from the combustion turbine exhaust gases.

The method may comprise a third mode of operation comprising supplying heat from the heat source to the first boiler at the temperature T1, without first storing the heat in the thermal energy storage system, to produce steam by heating feedwater with the heat supplied at temperature T1, heating the steam from the first boiler with heat from the combustion turbine exhaust gases to produce superheated steam at pressure P1, and expanding the superheated steam at pressure P1 through the steam turbine generator to generate electricity.

In the third mode of operation the method may comprise preheating the feedwater with heat from the combustion turbine exhaust gases.

The third mode of operation may comprise producing steam in a second boiler operated in parallel with the first boiler by heating feedwater with heat from the combustion turbine exhaust gases, mixing the steam from the first boiler with the steam from the second boiler, and heating the mixture of steam from the first boiler and steam from the second boiler with heat from the combustion turbine exhaust gases to produce the superheated steam at pressure P1. Optionally, in this variation of the third mode of operation the first boiler may produce steam using heat exclusively from the thermal energy storage system and the second boiler may produce steam using heat exclusively from the combustion turbine exhaust gases.

The method may comprise a fourth mode of operation comprising producing steam by heating feedwater with heat from the combustion turbine exhaust gases and without using heat from the heat source or the thermal energy storage system, heating the steam with heat from the combustion turbine exhaust gases and without using heat from the heat source or the thermal energy storage system to produce superheated steam at pressure P3<P1, and expanding only the superheated steam at pressure P3, no other superheated steam, through the steam turbine generator to generate electricity.

The method may comprise starting operation of the first boiler and the steam turbine generator using heat from the heat source, the thermal energy storage system, or the heat source and the thermal energy storage system before starting operation of the combustion turbine generator. This could reduce startup fuel consumption and air emissions.

The heat source may collect solar energy as heat. The heat source may comprise an electric heater. In the latter case, the method may comprise powering the electric heater with electricity generated with photovoltaic solar cells, with a solar thermal electric power plant, with a wind turbine, with a hydroelectric power plant, using nuclear power, by a fossil fuel fired thermal power plant, by a geothermal power plant, by a combination thereof, or with electricity generated in any other suitable manner.

Storing the heat in the thermal energy storage system may comprise storing the heat in a low vapor pressure heat transfer fluid at a pressure of about one atmosphere. In such a case, the parameters T1, T2, P1, and P2 may have, for example, the following values: 300° C.≤T1≤340° C., 35 bar≤P1≤75 bar, 240° C.≤T2≤290° C., and 15 bar≤P2≤55 bar.

Storing the heat in the thermal energy storage system may comprise storing the heat in a molten salt. In such a case, the parameters T1, T2, P1, and P2 may have, for example, the following values: 350° C.≤T1≤600° C., 65 bar≤P1≤125 bar, 250° C.≤T2≤400° C., and 30 bar≤P2≤90 bar.

Storing the heat in the thermal energy storage system may comprise storing the heat in a solid heat storage medium. In such a case, the parameters T1, T2, P1, and P2 may have, for example, the following values: 350° C.≤T1≤600° C., 65 bar≤P1≤125 bar, 250° C.≤T2≤400° C., and 30 bar≤P2≤90 bar.

More generally, the parameters T1, T2, P1, and P2 may have, for example, the following values: 300° C.≤T1≤600° C., 35 bar≤P1≤125 bar, 240° C.≤T2≤400° C., and 15 bar≤P2≤90 bar.

For a DSCC hybrid solar thermal combined cycle power plant with eight hours of thermal energy storage, the power plant could run around the clock during summer periods to achieve 88% Capacity Factor:

8 full-power hours while the sun shines, and heat transfer fluid flows from the solar field to the Steam Generator and to the hot tank for storage;

8 full-power hours with heat transfer fluid flowing from the hot tank to boiler 470 and then to the cold tank; and 8 part-power hours with heat transfer fluid flowing from the cold tank to the boiler 470 and then to the hot tank, or back to the cold tank.

Likewise, in winter periods, the operating hours would be extended.

Various tank and piping arrangements may be used to increase capacity factor and/or reduce cost as described above. The moderate temperature of the heat transfer fluid in those DSCC systems described herein that employ low vapor pressure heat transfer fluids may allow either tank to contain hot heat transfer fluid. Accordingly the hot and cold storage functions can alternate between two tanks, or three or more tanks could be used in a round-robin fashion, with one tank receiving heat transfer fluid and the others containing heat transfer fluid at higher temperatures.

Optimal operation of solar hybrid power plant 10 and 20 depends on performance parameters (for example, storage capacity, solar field capacity, combustion turbine generator capacity) which must be established during design, as well as parameters that are variable during the operation of the power plant. In addition, the solar resource forecast, instantaneous resource quantity, the available storage capacity, and the power capacity commitment and/or merchant power price and fuel cost are factors affecting the optimal use of the overall power plant. Moreover, assumptions about these latter factors may influence the selection of the performance design parameters.

For explanation, consider how certain parameters and factors would affect the optimal operation of the power plant operating on a grid subject to the 'Duck Curve.' Suppose the configuration of the power plant described above with operating parameters listed in Table 1, with four full-power hours of thermal storage (1700 MW-hour). On a particular day, eight full power hours of solar thermal resource (4250 MW-hour) may be forecast. During the mid-day period, when the highest solar resource is available, and the 'Duck Curve' overgeneration risk is highest, it may be desirable to reduce generation and divert solar thermal energy to storage. But around solar noon, the solar thermal system might have a capacity of 600 MW, meaning that the storage would be fully re-charged within 3 hours.

In anticipation of the need for storing energy in the thermal energy storage system, the optimal operating plan may attempt to fully deplete the energy storage during the early morning, and then split hot heat transfer fluid between the boiler and storage, with the intention that storage becomes full just as the solar resource could no longer supply the full boiler capacity. Given that the solar resource is different each day of the year, this is a challenge to achieve, once a fixed amount of storage has been selected. Accordingly, the design parameters may be optimized to maximize the value of the storage and solar thermal systems over the life of the power plant. Once a design point has been selected, the operating strategy may then be optimized to achieve the maximum revenue, given the fuel and electricity tariffs, which may vary by time of day.

Combustion turbine generators have the capability of burning a variety of fuels in addition to natural gas. In the event an emergency interrupts the supply of fuel gas, heat transfer fluid could be burned in the combustion turbine generator to maintain power generation. Although such an unexpected event (triggered for example by a natural disaster such as an earthquake) might never occur, the solar power plants described in this specification may readily facilitate emergency operation, upon provision of suitable fuel oil piping, nozzles, atomizers, etc.

This disclosure is illustrative and not limiting. Further modifications will be apparent to one skilled in the art in light of this disclosure and are intended to fall within the scope of the appended claims. For example, heat from a thermal energy storage system may be used to produce steam to maintain condenser seals and/or to peg a deaerating feedwater heater.

TABLE 1A

| | Gas flows through CTG 100 and HRSG 200 | | | | | | | |
|---|---|---|---|---|---|---|---|---|
| | Pressure | Temperature | Flow (kg/s) | | | | | |
| | (bar) | (° C.) | Total | O2 | N2 | H2O | CH4 | CO2 | Other gases |
| Fuel to CTG 100 | 28.000 | 335.477 | 14.0 | 0.0 | 0.3719 | 0.0 | 12.7 | 0.26 | balance |
| Inlet air to CTG 100 | 1.000 | 15.0 | 590.0 | 136.5 | 445.6 | 0.0 | 0.0 | 0.3 | balance |
| CTG 100 Exhaust | 1.002 | 615.1 | 604.0 | 83.4 | 445.9 | 29.7 | 0.0 | 37.4 | balance |
| HTHRU 210 Exhaust | 1.001 | 346.7 | 604.0 | 83.4 | 445.9 | 29.7 | 0.0 | 37.4 | balance |
| MTHRU 230 Exhaust | 1.001 | 169.0 | 604.0 | 83.4 | 445.9 | 29.7 | 0.0 | 37.4 | balance |
| LTHRU 240 Exhaust | 1.000 | 66.5 | 604.0 | 83.4 | 445.9 | 29.7 | 0.0 | 37.4 | balance |

TABLE 1B

Steam and Water Flows

| | Pressure (bar) | Temperature (° C.) | Flow rate (kg/s) | Enthalpy (kJ/kg) |
|---|---|---|---|---|
| Superheated Steam from HTHRU 210 | 61.5 | 548.0 | 250 | 3535.0 |
| Exhaust From STG 410 | 0.085 | 42.7 | 250 | 2534.6 |
| Condensate from ACC 420 | 0.085 | 40.0 | 250 | 167.5 |
| Condensate from Transfer Pump 430 | 2.21 | 40.1 | 250 | 168.2 |
| Condensate from Deaerator 450 | 2.21 | 104.9 | 250 | 439.6 |
| Feedwater from Pump 460 | 62.2 | 105.8 | 250 | 448.0 |
| Steam from MTHRU 230 | 62.2 | 280.0 | 50 | 2792.1 |
| Steam From Boiler 470 | 62.2 | 280.0 | 200 | 2792.1 |

TABLE 1C

HTF flows between Storage System 500 and Boiler 470

| | Pressure (bar) | Temperature (° C.) | Flow rate (kg/s) |
|---|---|---|---|
| HTF from Hot Tank 510 | 1 | 332 | 2358 |
| HTF from Pump 520 to boiler 470 | 10 | 332 | 2358 |
| HTF from boiler 470 to Cold Tank 530 | 3 | 261 | 2358 |

TABLE 1D

HTF flows between LTHRU 240 and Deaerator 450

| | Pressure (bar) | Temperature (° C.) | Flow rate (kg/s) |
|---|---|---|---|
| HTF from LTHRU 240 | 5 | 140 | 581 |
| HTF from Pump 520 to boiler 470 | 10 | 140 | 581 |
| HTF from boiler 470 to Cold Tank 530 | 3 | 90 | 581 |

TABLE 1E

Air Flow through Air Cooled Condenser 420

| Stream | Pressure (bar) | Temperature (° C.) | Flow rate (kg/s) | Enthalpy (kJ/kg) |
|---|---|---|---|---|
| Cooling Air IN | 1.00 | 15.0 | 30000.00 | 15.30 |
| Cold Air to ACC | 1.00 | 15.0 | 30000.00 | 15.33 |
| Hot Air from ACC | 1.00 | 34.5 | 30000.00 | 35.05 |

TABLE 1F

Heating Duties

| | Power |
|---|---|
| Heat Release Rate in Combustor of CTG 100 (HHV) | 739.5 |
| HTHRU 210 | 185.1 |
| Boiler 470 | 469.0 |
| MTHRU 230 | 117.2 |
| LTHRU 240 | 67.9 |
| ACC 420 | 591.8 |
| Deaerator 450 | 67.9 |

TABLE 1G

Electric Generation and Efficiency

| Component | Power |
|---|---|
| CTG 100 Power Output | 273.5 |
| STG 410 Power Output | 250.1 |
| Gross Power Output (CTG 100 plus STG 410) | 523.6 |
| Fuel Consumption | 739.5 |
| Gross Efficiency | 70.8% |
| Principal Parasitic Loads | |
| Fuel Gas Compressor (not shown) | 11.7 |
| Air Cooled Condenser 420 | 1.0 |
| Boiler Feedwater Pump 460 | 2.0 |
| HTF Circulating Pump 520 | 4.5 |
| HTF Circulating Pump 610 | 0.5 |
| Other House Loads | 1 |
| Net Generation | 502.9 |
| Net Efficiency | 68.0% |

TABLE 2

Power Plant Performance

| Case | Gross Power (kW) | Fuel (MMBtu/h) | Gross HHV Fuel Heat Rate (Btu/kWh) |
|---|---|---|---|
| DSCC | 29600 | 138 | 4662 |
| CTG only | 15000 | 138 | 9200 |
| CTG + HRSG | 17000 | 138 | 8117 |
| Cold Tank Use | 19000 | 138 | 7263 |

TABLE 3A

Gas flows through CTG 100 and HRSG 200

| | Pressure (bar) | Temperature (° C.) | Flow (kg/s) | | | | | |
|---|---|---|---|---|---|---|---|---|
| | | | Total | O2 | N2 | H2O | CH4 | CO2 | Other gases |
| Fuel to CTG 100 | 28.000 | 335.477 | 14.0 | 0.0 | 0.3719 | 0.0 | 12.7 | 0.26 | balance |
| Inlet air to CTG 100 | 1.000 | 15.0 | 590.0 | 136.5 | 445.6 | 0.0 | 0.0 | 0.3 | balance |
| CTG 100 Exhaust | 1.002 | 615.1 | 604.0 | 83.4 | 445.9 | 29.7 | 0.0 | 37.4 | balance |
| HTHRU 210 Exhaust | 1.001 | 460.1 | 604.0 | 83.4 | 445.9 | 29.7 | 0.0 | 37.4 | balance |

TABLE 3A-continued

Gas flows through CTG 100 and HRSG 200

| | Pressure (bar) | Temperature (° C.) | Flow (kg/s) Total | O2 | N2 | H2O | CH4 | CO2 | Other gases |
|---|---|---|---|---|---|---|---|---|---|
| MTHRU 230 Exhaust | 1.001 | 284.90 | 604.0 | 83.4 | 445.9 | 29.7 | 0.0 | 37.4 | balance |
| LTHRU 240 Exhaust | 1.000 | 233.4 | 604.0 | 83.4 | 445.9 | 29.7 | 0.0 | 37.4 | balance |

TABLE 3B

Steam and Water Flows

| | Pressure (bar) | Temperature (° C.) | Flow rate (kg/s) | Enthalpy (kJ/kg) |
|---|---|---|---|---|
| Superheated Steam from HTHRU 210 | 31.3 | 546.0 | 125 | 3559.6 |
| Exhaust From STG 410 | 0.085 | 42.7 | 125 | 2534.6 |
| Condensate from ACC 420 | 0.085 | 40.0 | 125 | 167.5 |
| Condensate from Transfer Pump 430 | 2.21 | 40.1 | 125 | 168.2 |
| Condensate from Deaerator 450 | 2.21 | 104.9 | 125 | 439.6 |
| Feedwater from Pump 460 | 32.0 | 105.8 | 125 | 443.7 |
| Steam from MTHRU 230 | 32.0 | 238.0 | 50 | 2806.0 |
| Steam From Boiler 470 | 32.0 | 238.0 | 69.1 | 2806.0 |
| Desuperheating Spray to HTHRU 210 | 32.0 | 105.8 | 5.9 | 443.7 |

TABLE 3C

HTF flows between Storage System 500 and Boiler 470

| | Pressure (bar) | Temperature (° C.) | Flow rate (kg/s) |
|---|---|---|---|
| HTF from Cold Tank 530 | 1 | 261 | 2358 |
| HTF from Pump 520 to boiler 470 | 10 | 261 | 2358 |
| HTF from boiler 470 to Hot Tank 510 | 3 | 238.5 | 2358 |

TABLE 3D

HTF flows between LTHRU 240 and Deaerator 450

| | Pressure (bar) | Temperature (° C.) | Flow rate (kg/s) |
|---|---|---|---|
| HTF from LTHRU 240 | 5 | 140 | 290 |
| HTF from Pump 520 to boiler 470 | 10 | 140 | 290 |
| HTF from boiler 470 to Cold Tank 530 | 3 | 90 | 290 |

TABLE 3E

Air Flow through Air Cooled Condenser 420

| Stream | Pressure (bar) | Temperature (° C.) | Flow rate (kg/s) | Enthalpy (kJ/kg) |
|---|---|---|---|---|
| Cooling Air IN | 1.00 | 15.0 | 15000.00 | 15.30 |
| Cold Air to ACC | 1.00 | 15.0 | 15000.00 | 15.33 |
| Hot Air from ACC | 1.00 | 34.5 | 15000.00 | 35.05 |

TABLE 3F

Heating Duties

| | Power |
|---|---|
| Heat Release Rate in Combustor of CTG 100 (HHV) | 739.5 |
| HTHRU 210 | 108.2 |
| Boiler 470 | 163.1 |
| MTHRU 230 | 118.1 |
| LTHRU 240 | 33.9 |
| ACC 420 | 306.5 |
| Deaerator 450 | 33.9 |

TABLE 3G

Electric Generation and Efficiency

| Component | Power |
|---|---|
| CTG 100 Power Output | 273.5 |
| STG 410 Power Output | 117.5 |
| Gross Power Output (CTG 100 plus STG 410) | 391.0 |
| Fuel Consumption | 739.5 |
| Gross Efficiency | 52.9% |
| Principal Parasitic Loads | |
| Fuel Gas Compressor (not shown) | 11.7 |
| Air Cooled Condenser 420 | .5 |
| Boiler Feedwater Pump 460 | 1.0 |
| HTF Circulating Pump 520 | 4.5 |
| HTF Circulating Pump 610 | 0.5 |
| Other House Loads | 1 |
| Net Generation | 371.8 |
| Net Efficiency | 50.3% |

TABLE 4

Heat Transfer Fluids and Heat Storage Media

| Storage Medium | Temperature Range | Density | Specific Heat | Figure of Merit |
|---|---|---|---|---|
| Duratherm 630 | −5 C.-335 C. | 651.46 kg/cu. m. | 2.971 kJ/kg-C. | 1935 kJ/cu. m.-C. |
| Dynalene MS-2 | 140 C.-485 C. | 1890 kg/cu. m. | 1.59 kJ/kg-C. | 3005 kJ/cu. m.-C. |
| Dynalene MS-1 | 250 C.-565 C. | 1900 kg/cu. m. | 1.40 kJ/kg-C. | 2660 kJ/cu. m.-C. |
| EnergyNest | 0 C.-427 C. | | | 353 kJ/cu. m.-C. |
| Graphite | 0 C.-2000 C. | 2090 kg/cu. m. | 0.71 kJ/kg-C. | 1484 kJ/cu. m.-C. |

What is claimed is:

1. A method of operating a combined cycle electric power plant, the method comprising:
    operating a topping cycle that combusts fuel to generate electricity and produce hot exhaust gases;
    storing heat from a heat source other than the topping cycle in a thermal energy storage system at a temperature T1;
    in a first mode of operation:
        producing steam in a boiler by heating feedwater with heat supplied at temperature T1 from the thermal energy storage system by a heat transfer fluid, thereby cooling the heat transfer fluid, and storing heat from the cooled heat transfer fluid in the thermal energy storage system at a temperature T2<T1;
        heating the steam from the boiler with heat from the topping cycle exhaust gases to produce superheated steam at pressure P1; and
        expanding the superheated steam at pressure P1 through a steam turbine generator to generate electricity;
    and in a second mode of operation, after depleting the thermal energy storage system of heat stored at temperature T1:
        producing steam in the boiler by heating feedwater with heat supplied from the thermal energy storage system at a temperature of T2 or less by the heat transfer fluid;
        heating the steam from the boiler with heat from the topping cycle exhaust gases to produce superheated steam at pressure P2<P1; and
        expanding the superheated steam at pressure P2 through the steam turbine generator to generate electricity.

2. The method of claim 1, wherein the heat source other than the topping cycle is or comprises an electric heating system.

3. The method of claim 2, wherein storing heat from the heat source in the thermal energy storage system comprises storing time-varying quantities of electric energy as heat in the thermal energy storage system.

4. The method of claim 3, comprising regulating a flow rate of heat transfer fluid from the thermal energy storage system to the electric heating system proportionally to electric power delivered to the electric heating system.

5. The method of claim 3, comprising regulating a temperature to which heat transfer fluid from the thermal energy storage system is heated by adjusting electric power delivered to the electric heating system.

6. The method of claim 2, wherein the topping cycle comprises a combustion turbine producing at least some of the hot exhaust gases.

7. The method of claim 6, wherein storing heat from the heat source in the thermal energy storage system comprises storing time-varying quantities of electric energy as heat in the thermal energy storage system.

8. The method of claim 1, wherein the pressure P1 and the pressure P2 are each controlled by a rate at which heat is supplied from the thermal energy storage system to the boiler.

9. The method of claim 8, comprising controlling a heat transfer fluid flow rate to control the rate at which heat is supplied from the thermal energy storage system to the boiler.

10. The method of claim 1 comprising, in both the first mode of operation and the second mode of operation, preheating the feedwater with heat from the topping cycle exhaust gases.

11. The method of claim 1, comprising:
    in a third mode of operation:
        supplying heat from the heat source to the boiler at the temperature T1, without first storing the heat in the thermal energy storage system, to produce steam by heating feedwater with the heat supplied at temperature T1;
        heating the steam from the boiler with heat from the topping cycle exhaust gases to produce superheated steam at pressure P1; and
        expanding the superheated steam at pressure P1 through the steam turbine generator to generate electricity.

12. The method of claim 11, comprising in the third mode of operation preheating the feedwater with heat from the topping cycle exhaust gases.

13. The method of claim 1, comprising:
    in a fourth mode of operation:
        producing steam by heating feedwater with heat from the topping cycle exhaust gases and without using heat from the heat source or the thermal energy storage system;
        heating the steam with heat from the topping cycle exhaust gases and without using heat from the heat source or the thermal energy storage system to produce superheated steam at pressure P3<P1; and
        expanding only the superheated steam at pressure P3, no other superheated steam, through the steam turbine generator to generate electricity.

14. The method of claim 1, wherein storing the heat in the thermal energy storage system comprises storing the heat in a low vapor pressure heat transfer fluid at a pressure of about one atmosphere.

15. The method of claim 14, wherein:
    300° C.≤T1≤340° C.;
    35 bar≤P1≤75 bar;
    240° C.≤T2≤290° C.; and
    15 bar≤P2≤55 bar.

16. The method of claim 1, wherein storing the heat in the thermal energy storage system comprises storing the heat in a molten salt.

17. The method of claim 16, wherein:
    350° C.≤T1≤600° C.;
    65 bar≤P1≤125 bar;
    250° C.≤T2≤400° C.; and
    30 bar≤P2≤90 bar.

18. The method of claim 1, wherein storing the heat in the thermal energy storage system comprises storing the heat in a solid heat storage medium.

19. The method of claim 18, wherein:
    350° C.≤T1≤600° C.;
    65 bar≤P1≤125 bar;
    250° C.≤T2≤400° C.; and
    30 bar≤P2≤90 bar.

20. The method of claim 1, wherein:
    300° C.≤T1≤600° C.;
    35 bar≤P1≤125 bar;
    240° C.≤T2≤400° C.; and
    15 bar≤P2≤90 bar.

* * * * *